United States Patent [19]

Labasque et al.

[11] Patent Number: 6,068,678
[45] Date of Patent: May 30, 2000

[54] PROCESS FOR SEPARATING A GASEOUS FLOW BY A PSA PROCEDURE

[75] Inventors: Jacques Labasque, Versailles; Serge Moreau, Velizy-Villacoublay; Christine Marot, Buc, all of France

[73] Assignee: L'Air Liquide, Societe Anonyme pour l'Etude et l'Exploitation des Procedes Georges Claude, Paris, France

[21] Appl. No.: 09/110,245

[22] Filed: Jul. 6, 1998

[30] Foreign Application Priority Data

Jul. 7, 1997 [FR] France .................................. 97 08590

[51] Int. Cl.$^7$ .................................................. B01D 53/047
[52] U.S. Cl. .................................... 95/96; 95/130; 95/902
[58] Field of Search .......................... 95/96–98, 100–105, 95/130, 902; 96/108, 130, 144

[56] References Cited

U.S. PATENT DOCUMENTS

| | | | |
|---|---|---|---|
| 4,194,891 | 3/1980 | Earls et al. | 95/130 X |
| 4,194,892 | 3/1980 | Jones et al. | 55/58 |
| 4,406,675 | 9/1983 | Dangieri et al. | 95/96 X |
| 4,450,082 | 5/1984 | Tanouchi et al. | 210/660 |
| 4,964,888 | 10/1990 | Miller | 95/130 X |
| 5,071,449 | 12/1991 | Sircar | 95/98 |
| 5,122,164 | 6/1992 | Hirooka et al. | 95/130 X |
| 5,152,813 | 10/1992 | Coe et al. | 95/130 X |
| 5,174,979 | 12/1992 | Chao et al. | 423/715 |
| 5,176,721 | 1/1993 | Hay et al. | 95/96 |
| 5,258,058 | 11/1993 | Coe et al. | 95/130 X |
| 5,464,467 | 11/1995 | Fitch et al. | 95/130 X |
| 5,658,370 | 8/1997 | Vigor et al. | 95/130 X |
| 5,672,195 | 9/1997 | Moreau et al. | 95/130 X |
| 5,674,311 | 10/1997 | Notaro et al. | 95/130 X |
| 5,868,818 | 2/1999 | Ogawa et al. | 95/130 X |
| 5,891,218 | 4/1999 | Rouge et al. | 95/130 X |

*Primary Examiner*—Robert H. Spitzer
*Attorney, Agent, or Firm*—Young & Thompson

[57] ABSTRACT

A PSA process for the separation of a feed gas, for example air, containing at least one first component, such as nitrogen, and a second component, such as oxygen, by preferential adsorption of the first component at a high adsorption pressure, on at least one bed of particles of an adsorbent material and recovery of a gas flow enriched in the second component, with desorption of the first component at a low desorption pressure. The ratio ($\mu/\sigma$) of the mean granulometry ($\mu$) of the adsorbent particles contained in the bed, to the breadth of granulometric distribution ($\sigma$) of the particles, is comprised within the range 1.5 to 15, the particles of adsorbent material being particles of zeolite, such as zeolite X or zeolite LSX, exchanged by metallic cations, preferably cations of lithium and/or calcium.

13 Claims, 5 Drawing Sheets

PROCESS FOR SEPARATING A GASEOUS FLOW BY A PSA PROCEDURE

CROSS REFERENCE TO RELATED APPLICATION

This application corresponds to French application 97/08590 of Jul. 7, 1997, the disclosure of which is incorporated herein by reference.

FIELD OF THE INVENTION

The invention relates to a PSA procedure for the separation of a gaseous feed, for example an air flow, containing at least one first component, for example nitrogen, and a second component, for example oxygen, by preferential adsorption of said first component, for example nitrogen, on particles of at least one material adsorbing preferentially the first component and recovery of a gaseous flow enriched in said second component, for example a flow enriched in oxygen, which is to say impoverished in nitrogen.

BACKGROUND OF THE INVENTION

Oxygen is a gas having a great interest industrially because it has multiple applications in numerous technical fields, for example in the production of steel, glass or paper, medicine, metal welding, combustion or depollution.

One of the techniques used at present to produce oxygen is the so-called "PSA" technique (Pressure Swing Adsorption); there is meant by PSA processes, not only PSA processes properly so-called, but also analogous processes, such as VSA (Vacuum Swing Adsorption) processes or MPSA (Mixed Pressure Swing Adsorption) processes.

Thus, it is usual to separate oxygen from a gaseous mixture comprising essentially oxygen and nitrogen, such as air, by adsorption of the nitrogen on a material preferentially adsorbing nitrogen, said adsorption of nitrogen being carried out by variation of the pressure applied in the separation zone and containing said adsorbent material; oxygen that does not adsorb or only a little absorbs, will be recovered at the outlet of said separation zone. Such PSA processes are conventionally described in the prior art.

Schematically, a PSA process for the separation of oxygen from a gaseous mixture containing essentially oxygen and nitrogen, such as air, further comprises:

- a step of selective adsorption of the nitrogen on an adsorbent material and at an adsorbent pressure called "high pressure";
- a step of desorption of the nitrogen trapped by the adsorbent, at a desorption pressure, called "low pressure", lower than the adsorption pressure;
- a step of repressurization of the adsorption zone comprising the adsorbent, from the low pressure to the high pressure;

oxygen or a gas enriched in oxygen being recovered during the adsorption phase of the nitrogen.

The efficiency of separation of the gaseous mixture, and hence of recovery of oxygen, depends on numerous parameters, namely, particularly the high pressure, the low pressure, the type of adsorbent material and its affinity for the components to be separated, the composition of the gaseous mixture to be separated, the temperature of said mixture to be separated, the granulometry, which is to say the size and shape of the adsorbent particles used, the composition of these balls, the temperature gradient prevailing within the adsorbent bed, the geometry of the adsorbers . . . .

Until now, no law of general behavior has been until now worked out, the publications which can be found in the prior art dealing in general only with one of these parameters, for example the type of adsorbent used in the separation process, the adsorption and desorption pressures, the temperature of the air to be separated . . . .

Certain papers nevertheless deal more specifically with the granulometry, which is to say the mean size and shape of the adsorbent particles, in general "balls" of zeolite, used in the PSA process.

Thus, it is known that the granulometry of the particles plays a role in the efficiency of separation of the constituents of gaseous mixture, such as the separation of the constituents nitrogen and oxygen from air.

Thus, the balls of adsorbent of small diameter or "small balls", for example zeolite balls of less than 2.5 mm diameter, are more effective than balls of larger size because they permit decreasing the cycle time of the PSA process and, correspondingly, produce more oxygen for a given time. However, small balls have several drawbacks tending to detract from the good operation of the PSA process. In particular, they give rise to higher pressure drop within the adsorbent bed and, because of their small diameter, they are susceptible to pass easily through grills of adsorbers designed to retain them.

Conversely, although large balls give rise to less pressure drop within the adsorbent bed, pass less easily through grills of the adsorbers and have higher resistance, particularly to crushing, their use in PSA processes generally leads to a separation that is less effective and rarely optimum, of the constituents of the gaseous mixture to be separated.

There exist in the prior art publications describing the ranges of sizes of balls of zeolite, which is to say the ranges of mean granulometry of the adsorbent particles, in general less than 5 mm.

Thus, the documents EP-A-8619, U.S. Pat. No. 4,194,892 and EP-A-0488926 disclose processes of the RPSA (Rapid Pressure Swing Adsorption) type, using balls whose size is comprised respectively between 0.125 mm and 0.84 mm, between 0.12 and 0.85 mm and between 0.05 and 0.20 mm. It must nevertheless be pointed out that the RPSA processes operate opposite the PSA processes, which is to say that in an RPSA process, it is sought to establish a large pressure drop.

Moreover, the documents U.S. Pat. No. 5,174,979 and U.S. Pat. No. 4,544,378 disclose gas separation processes using zeolites having a mean granulometry comprised between 8 and 12 mesh (namely 1.65 to 2.36 mm).

The document U.S. Pat. No. 4,925,460 teaches a gas separation process using balls of zeolite having a size at least 0.12 mm.

Schematically, all the previous documents describe ranges of mean ball size, which is to say ranges of mean granulometry adapted to promote the use of the PSA process.

SUMMARY OF THE INVENTION

However, the inventors of the present invention have discovered that, if it is effectively necessary to take account of the mean granulometry ($\mu$) of the adsorbent particles, which effectively play a role in the compactness of the particle bed, it is also indispensable, to obtain effective separation of the constituents of the gaseous mixture to be separated, to consider also the width of the granulometric distribution ($\sigma$) of said adsorbent particles. In the scope of the present invention, the characteristic dimension of the adsorbent particles in question, to calculate the values of $\mu$ and $\sigma$, is the hydraulic diameter of said particles. Thus, for adsorbent balls, there is considered their diameter and, in the general case, the hydraulic diameter corresponds to six times the volume of the surface.

It has been shown that the width of the granulometric distribution (σ) of the particles has a contrary influence on adsorption by unit volume and on the kinetics of the adsorbent particles, on the one hand, and on the pressure drops, on the other hand.

Thus, an increase in the width of the granulometric distribution (σ) gives rise to:

an increase of adsorption per unit volume of the particles, by, in particular, a better rearrangement of the particles among themselves, and hence a decrease of the porosity of the bed of adsorbent balls, an increase in the kinetics of the molecular sieve, and an increase in pressure drop.

Accordingly, the object of the invention is to provide a PSA process improved relative to existing processes, which is to say a PSA process in which the influence of the breadth of granulometric distribution (σ) has been taken into account so as to optimize the efficiency of separation of the gaseous components, thus leading to increased productivity and yield, hence to lower consumption of energy and molecular sieve.

The invention thus relates to a process for the separation of a gaseous feed containing at least one first component and one second component, by preferential adsorption of the first component, at a high adsorption pressure, on at least one bed of particles of at least one adsorbent material, and recovering a gaseous flow enriched in said second component, and by desorption of the first component at a low desorption pressure, characterized in that the ratio ($\mu/\sigma$) of the mean granulometry ($\mu$) of the adsorbent particles contained in said bed over the breadth of granulometric distribution (σ) of said particles is comprised within the range 1.5 to 15, preferably, the ratio $\mu/\sigma$ is comprised in the range 2 to 13, preferably further in the range 3 to 10, the particles of adsorbent material being particles of zeolite exchanged with metallic cations.

As the case may be, the process of the invention can comprise one or several of the following characteristics:

the particles of adsorbent material are particles of zeolite X or LSX (for Low Silica X) having a Si/Al ratio comprised between about 1 and about 1.5, preferably of the order of 1;

the particles of adsorbent material are particles of exchanged zeolite;

the thickness of the particle bed is comprised between 0.1 and 3 m, preferably between 0.2 and 2 m and, still more preferably between 0.3 and 1.2 m.

the high adsorption pressure is comprised within the range $10^5$ Pa to $10^6$ Pa; and/or the low pressure of desorption is comprised in the range $10^4$ Pa to $10^5$ Pa;

said particles having a mean size comprised between 0.3 and 3 mm, preferably between 0.5 and 2.2 mm, preferably between 0.6 and 1.6, preferably between 0.8 and 1.2 mm;

the zeolite particles contain cations selected from the group consisting of calcium, lithium, zinc, strontium, magnesium, copper, aluminum, nickel, cobalt, manganese, chromium, barium, sodium, scandium, gallium, iron, indium, yttrium, lanthanides and their mixtures, the particles of adsorbent are particles of zeolite X or LSX exchanged to the extent of at least 60%, preferably at least 70%, still preferably at least 80%, with cations of lithium and/or calcium;

the gaseous feed is at a temperature comprised between 15° C. and 55° C., preferably 20° to 45° C.;

The first component is nitrogen and/or the second component is oxygen; preferably, the gaseous feed is air.

According to another aspect, the invention also relates to an adsorbent adapted to be used to separate gases, particularly in the process described above, said adsorbent containing particles of zeolite of type X or LSX exchanged to the extent of at least 60%, preferably at least 70%, still more preferably at least 80%, with lithium and/or calcium ions, the ratio ($\mu/\sigma$) of the mean granulometry ($\mu$) of said particles to the breadth of granulometric distribution (σ) of said particles being comprised within the range of 1.5 to 15, preferably between 2 and 13, said particles having a mean size comprised between 0.3 and 3 mm, preferably between 0.5 and 2.2 mm, preferably between 0.6 and 1.6, preferably between 0.8 and 1.2 mm.

Preferably, said zeolite particles contain also metallic cations, identical or different, selected from the group comprised by zinc, strontium, magnesium, copper, aluminum, nickel, cobalt, manganese, chrome, barium, sodium, scandium, gallium, iron, indium, yttrium, lanthanides and their mixtures.

BRIEF DESCRIPTION OF THE DRAWINGS

The invention will now be described in greater detail, with the help of examples given for purposes of illustration but in no way limiting, and with reference to the accompanying drawings.

DETAILED DESCRIPTION OF THE INVENTION

The granulometric distribution f of the particles of adsorbent is a function dependent on the hydraulic diameter of the particles and which, by integration between a diameter d1 and a diameter d2 (with d2≧d1) of the particles, reflects the mass proportion (p(d1, d2) of particles whose diameter is comprised between the values d1 and d2. This can be expressed by the following formula (1):

$$p(d1, d2) = \int_{d1}^{d2} f(x) \cdot dx \tag{1}$$

Moreover, the mean granulometry ($\mu$) and the breadth of the granulometric distribution (σ) are defined respectively by the following formulas (2) and (3):

$$\mu = \int_{o}^{\infty} x \cdot f(x) \cdot dx \tag{2}$$

-continued $$\sigma^2 = \int_o^\infty (x-\mu)^2 \cdot f(x) \cdot dx \quad (3)$$

So as to study the influence of the breadth of granulometric distribution (σ) on porosity (ε) of the bed of adsorbent particles, there is carried out a screening of the adsorbent particles (here balls of zeolite) having a given granulometric distribution.

This screening is carried out by using a screen having different mesh sizes, namely: 1 mm, 1.25 mm, 1.4 mm, 1.6 mm and 1.8 mm, so as to obtain specimens of the particles having separate granulometries, as well as a mean granulometry ($\mu$) and a breadth of granulometric distribution (σ).

The various specimens, further called granulometric cuts, obtained are then mixed 2 by 2, then 3 by 3, so as to obtain more specimens of different combinations as to mean granulometry and breadth of granulometric distribution, which is to say having different values of the ratio ($\mu/\sigma$).

There is then measured the volumetric mass of each specimen of adsorbent particles and it is determined that the densest of them have a porosity (ε) of 0.38; the porosity (ε) being defined as the ratio of the empty inter-particle volume to the total volume.

Knowing therefore the mean granulometry ($\mu$) and the breadth of the granulometric distribution (σ) of the different specimens, there is determined the ratio existing between the porosity (ε) and the ratio $\sigma/\mu$ (which is the inverse of the ratio $\mu/\sigma$).

Figure 1:
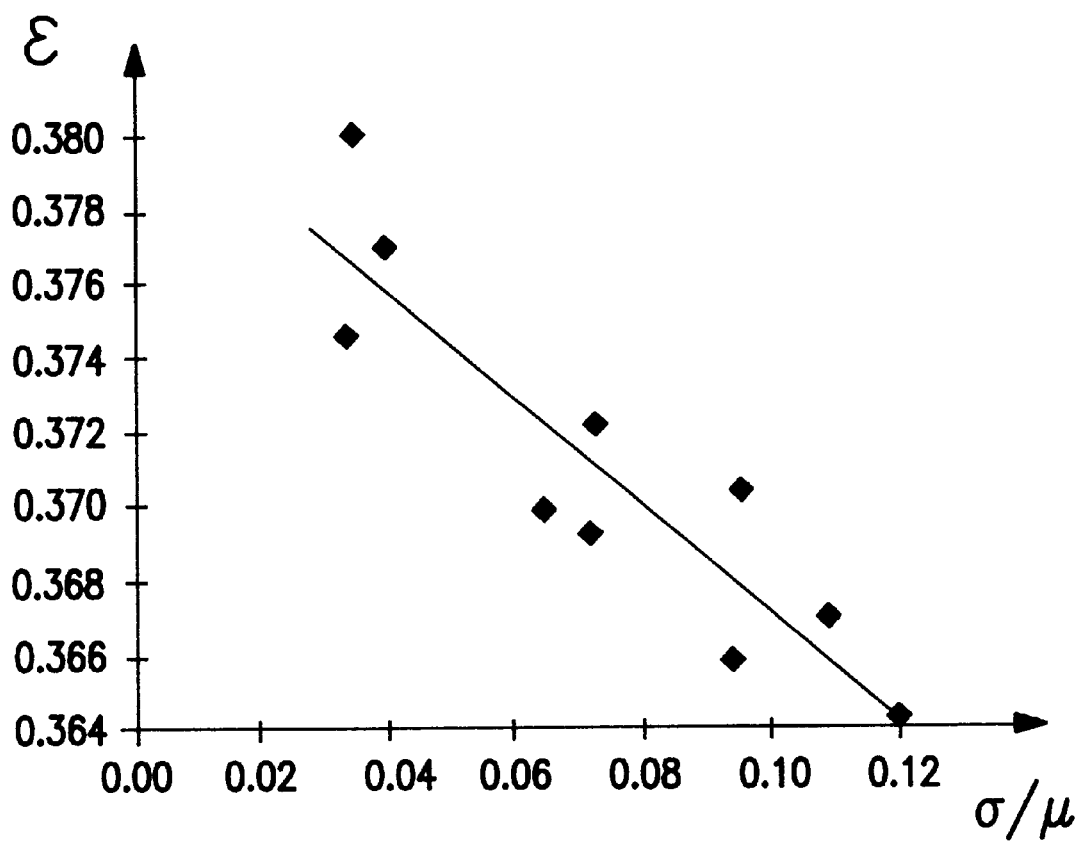
FIG. 1 representing the relationship between the porosity (ε) and the ratio ($\sigma/\mu$) of breadth of granulometric distribution (σ) to mean granulometry ($\mu$)
Figure 2:
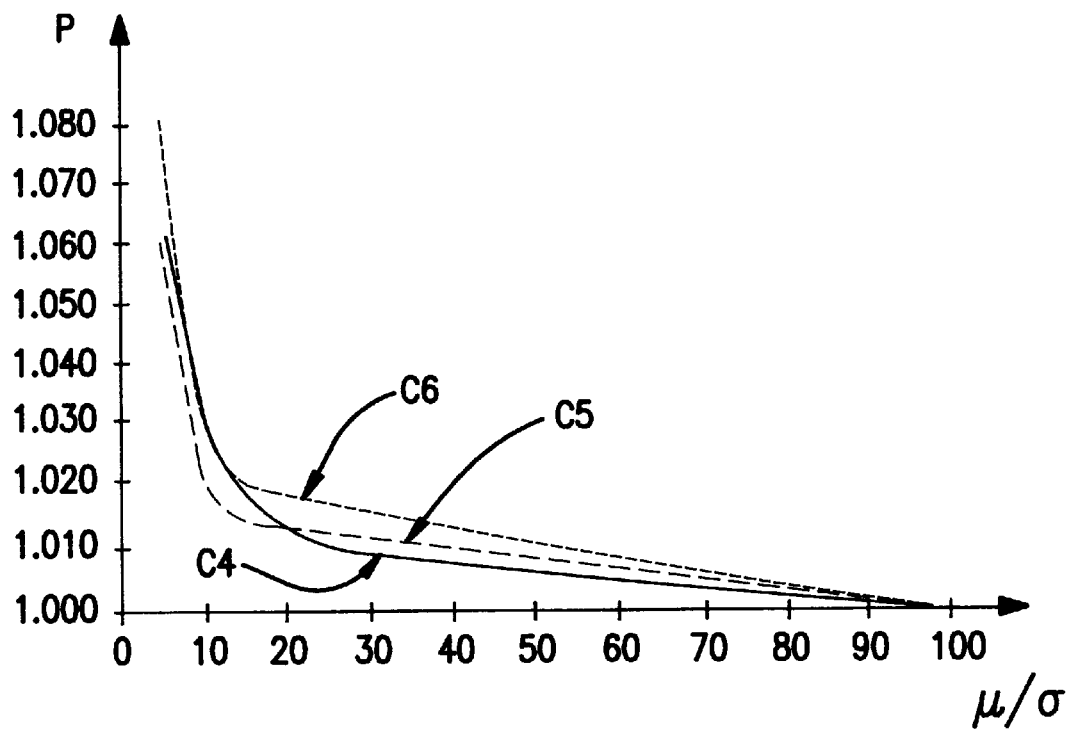
FIGS. 2, 4, 6 and 8 are graphical representations of the relationship between the index of productivity P obtained per cycle as a function of different values of the ratio $\mu/\sigma$.
Figure 3:
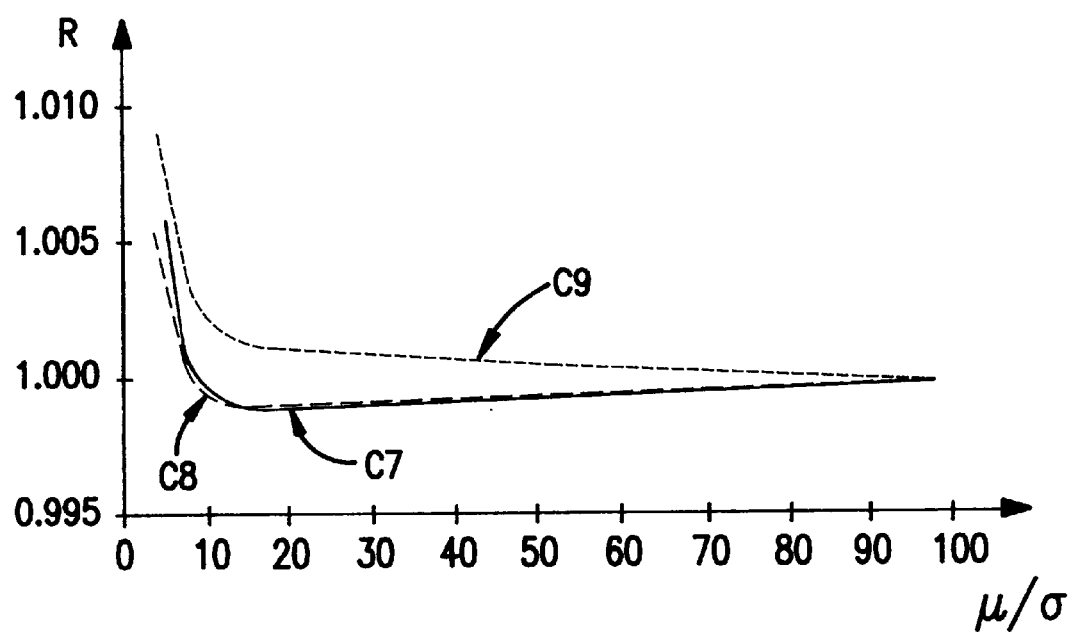
FIGS. 3, 5, 7 and 9 are graphical representations of the index of yield R obtained by simulation as a function of different values of the ratio $\mu/\sigma$.
Figure 4:
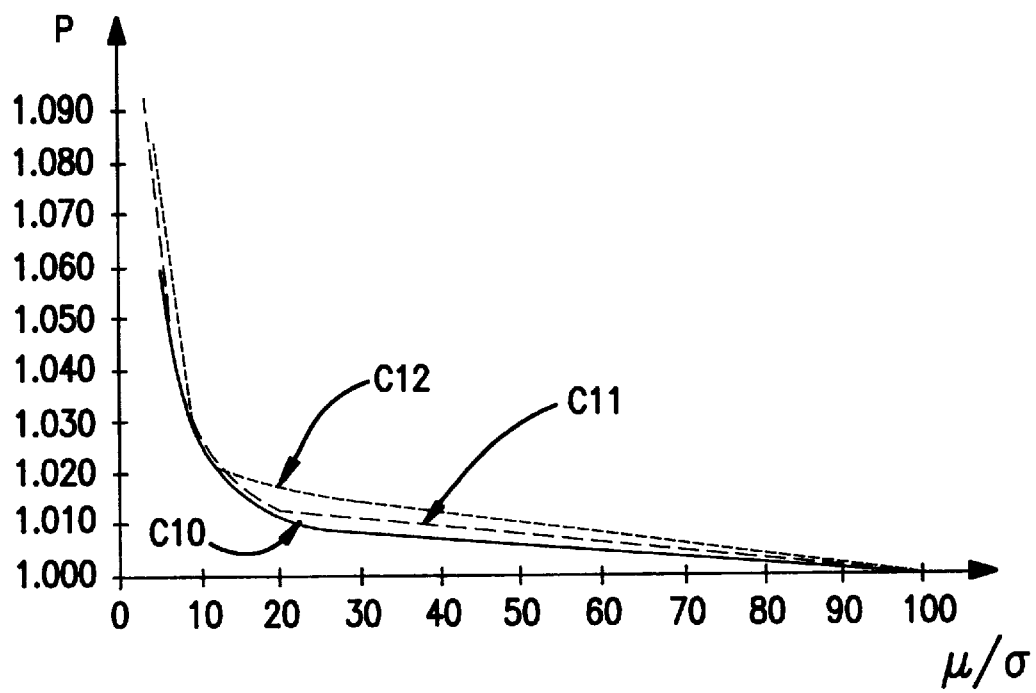
Figure 5:
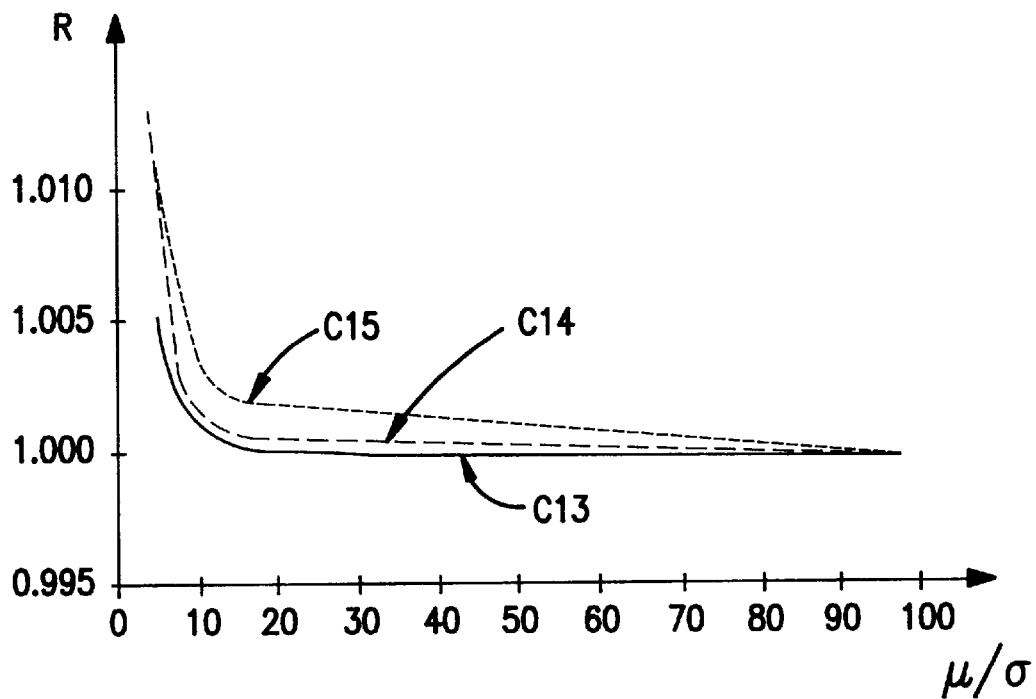
Figure 6:
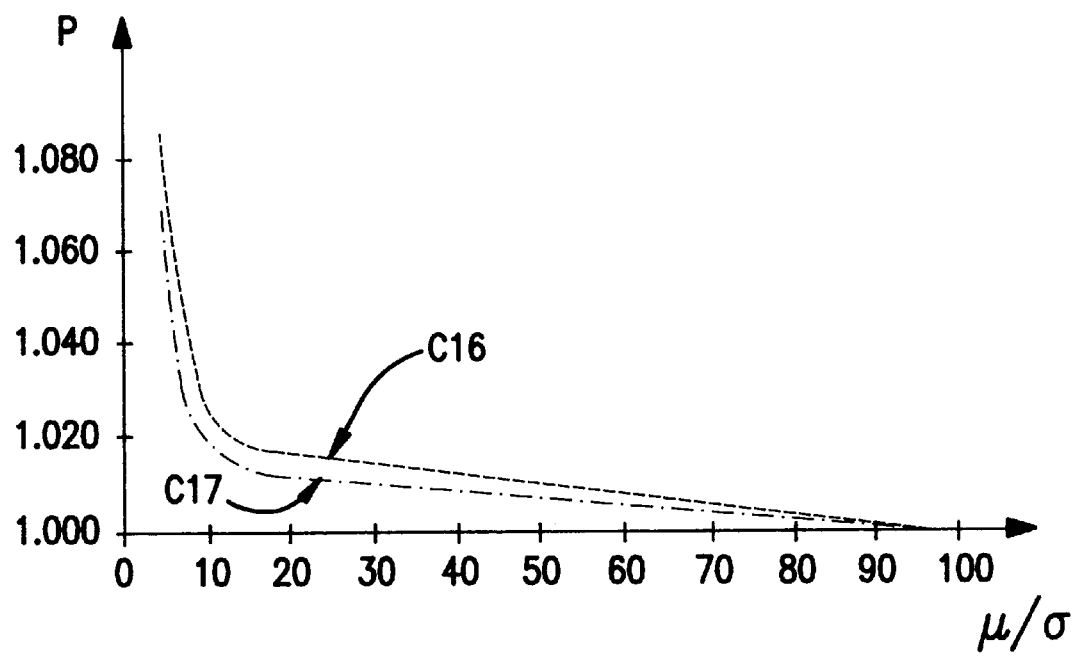
Figure 7:
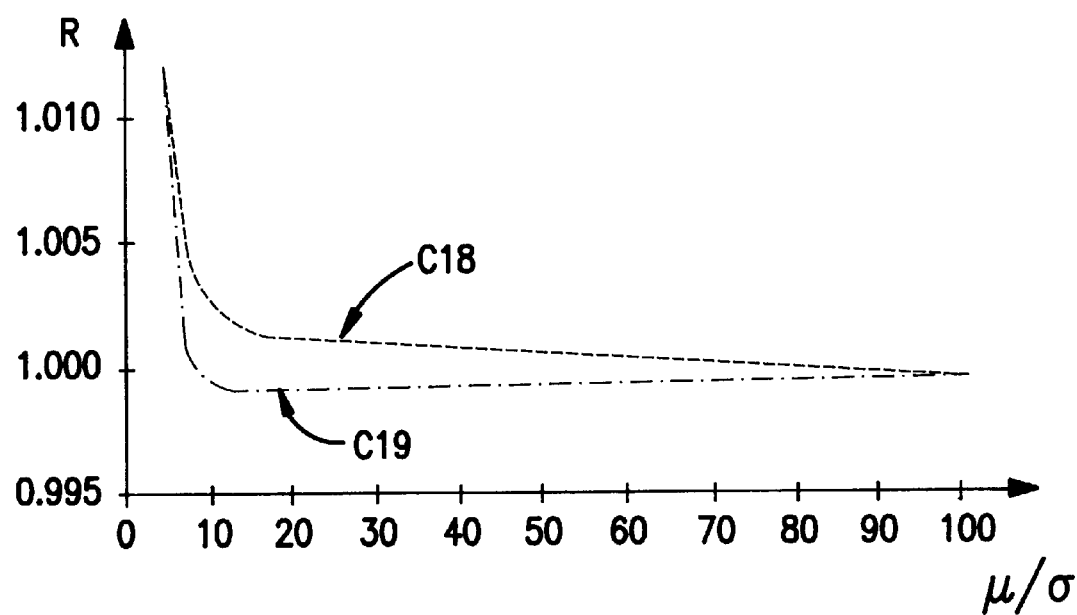
Figure 8:
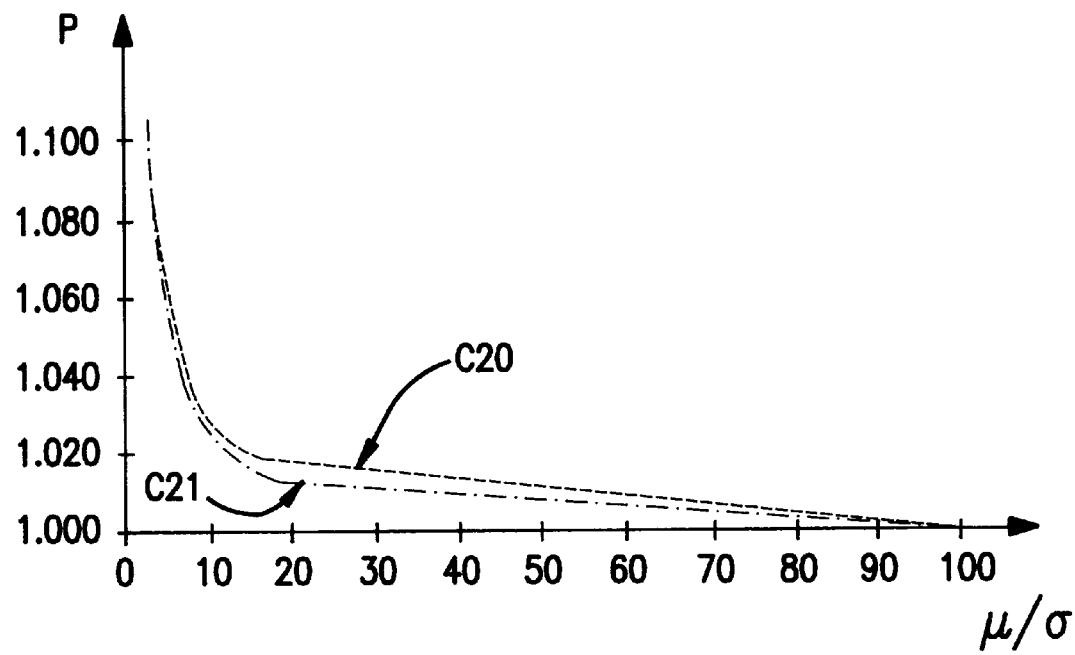
Figure 9:
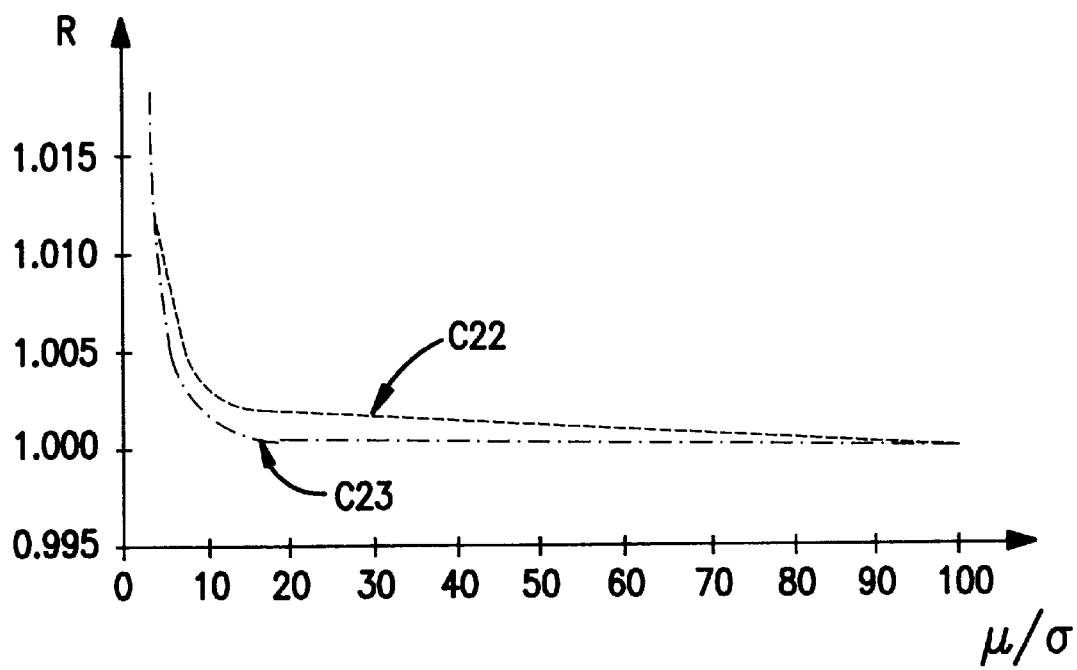

The results obtained are shown in FIG. 1, from which it appears that the porosity is a close function of the ratio ($\sigma/\mu$). In the particular case, the relationship connecting the porosity and the ratio ($\sigma/\mu$) is as follows:

ε=−0.1418·(σ/$\mu$)+0.3815

From this, it results that an increase in the breadth of the granulometric distribution (σ) implies a decrease in porosity (ε) and hence a desirable increase in adsorption per unit of volume of the particles.

From the results obtained above, particularly the breadth of the granulometric distribution (σ) and the porosity (ε), there are evaluated the pressure drops with the aid of the Ergun formula given in "Principles of Adsorption and Adsorption Processes", 1984, Ruthven, section 7.3, from which it appears that an increase of the breadth of granulometric distribution (σ) gives rise to an undesirable increase in pressure drop.

Moreover, so as to study the influence of the breadth of the granulometric distribution on the kinetics of the adsorbent particles, one acts on the hypothesis that there exists, within the bed of adsorbent particles, an elemental representative volume sufficiently large to be representative of the granulometric distribution within said bed and sufficiently small to react in an autonomous manner as to the kinetics of adsorption.

However, according to the kinetic model of the Linear Driving Force defined by Ruthven, "Pressure Swing Adsorption", 1994, section 5.15, an adsorbent ball has a kinetic coefficient k, which is related to the size of said ball.

Hence, each representative elemental volume must correspond with a kinetic coefficient of its own equal to the mean of the kinetic coefficients of the balls which comprise it.

From this, for a bed of adsorbent balls of granulometric distribution f and of an intrinsic kinetics k, the overall kinetic coefficient ($k_g$) is given by the following equation (4):

$$k_g = \int_o^\infty k(x) \cdot f(x) \cdot dx \quad (4)$$

wherein k(x)=k/x² (5), in which k(x) is the kinetic coefficient of a ball of diameter x.

It follows from equations (4) and (5) that, for a fixed $\mu$, an increase of a increases positively the kinetic coefficient, hence the kinetics of the adsorbent balls.

EXAMPLES

So as to verify the proceeding observations, tests of simulations have been carried out and are given hereafter.

The parameters used to carry out the different simulations of the PSA process are as follows:

3 separate adsorption zones functioning in parallel, total duration of this treatment cycle: 3×30 sec or 3×15 sec, gaseous mixture to be separated: air (with the argon counted as oxygen), first preferentially adsorbed component: nitrogen, second adsorbed component: oxygen, thickness of the adsorbent bed: 0.5 m or 1 m, adsorbent: balls of zeolite, mean granulometry: comprised between 0.8 mm and 1.4 mm, breadth of granulometric distribution: less than or equal to 0.3 mm, types of granulometric distribution: uniform or gaussian, adsorption pressure: $1.1 \times 10^5$ Pa, desorption pressure: $0.27 \times 10^5$ Pa, temperature of feed flow: 20° C., purity of oxygen product: 90% or 93%.

The program used for simulation of the following examples relies on the principles of conservation of mass, conservation of enthalpy, conservation of motion, and uses the model of the Linear Driving Force to evaluate the kinetics of the solid-gas transfers within the adsorbent mass. Such models of simulation are particularly described in "Pressure Swing Adsorption", Ruthven, Farooq and Knaebel, VCH Publishers, 1994, pages 172–209; and in "Fluid Flow Through Packed Columns", S. Ergun, *Chem. Engr. Prog.*, 48(2), 89(1952). The solution of the equations can itself be carried out for example by means of the DIVPAG program of the International Mathematical and Statistical Library maintained by the Microsoft™ company, or by the program ADSIM of the company AspenTech™. One skilled in the art is quite able to select a suitable simulation program from among the numerous programs available on the market and to plug in the preceding data. If needed, reference could also be had to the article of D. G. Hartzog and S. Sircar: "Adsorption", 1, 133–151 (1995), "Sensitivity of PSA Process Performance to Input Variables", describing a similar program.

In FIGS. 2, 4, 6 and 8, there is shown, on the ordinates, the index of productivity (P) obtained per cycle, per simulation, as a function of the different values of the ratio $\mu/\sigma$ (on the abscissae) and this for different values of bed thickness and of cycle time indicated in the Table hereafter. The productivity corresponds to the quantity of oxygen produced per unit of mass or volume of adsorbent. The rate of productivity is distinguished, in which the quantity of oxygen measured is the quantity of oxygen produced continuously during production per cycle, in which the quantity of oxygen measured is the quantity of oxygen produced in the course of a PSA cycle. The index of productivity is the ratio of productivity calculated at a reference productivity obtained for an infinite value of $\mu/\sigma$.

In FIGS. 3, 5, 7 and 9, there is shown on the ordinates, the index of yield (R) obtained, by simulation, as a function of the different values of the ratio $\mu/\sigma$ (on the abscissae) for different values of bed thickness and cycle times indicated in the following Table.

The yield is the ratio of the quantity of oxygen produced per PSA cycle and during a given period of time, to the quantity of oxygen contained in the initial mixture introduced into the PSA.

The yield index is the ratio of yield calculated for a reference yield obtained for an infinite value of $\mu/\sigma$.

TABLE

| FIGS. No. | Curves No. | Cycle (sec) | Bed Thickness (m) | $\mu$ (mm) | Distribution Type | Oxygen Purity (%) |
|---|---|---|---|---|---|---|
| 2 and 3 | C4 and C7 | 3 × 30 | 1 | 1.2 | uniform | 93 |
| | C5 and C8 | 3 × 30 | 0.5 | 0.8 | | |
| | C6 and C9 | 3 × 15 | 0.5 | 0.8 | | |
| 4 and 5 | C10 and C13 | 3 × 30 | 1 | 1.4 | uniform | 90 |
| | C11 and C14 | 3 × 30 | 0.5 | 0.8 | | |
| | C12 and C15 | 3 × 15 | 0.5 | 1.0 | | |
| 6 and 7 | C16 and C18 | 3 × 30 | 0.5 | 0.8 | gaussian | 93 |
| | C17 and C19 | 3 × 15 | 0.5 | 0.8 | | |
| 8 and 9 | C20 and C22 | 3 × 30 | 0.5 | 0.8 | gaussian | 90 |
| | C21 and C23 | 3 × 15 | 0.5 | 1 | | |

From curves C4 to C23, it appears that when the ratio $\mu/\sigma$ is varied, the yield and productivity of the PSA process are subject to imperceptible variations (decrease and/or increase) for values of $\mu/\sigma$ comprised between 15 and +∞. However, there is observed a surprising increase in the performance of the PSA process, which is to say the productivity and the yield, for values of $\mu/\sigma$ less than or equal to 15 (particularly 10) to a lowering limit of 1.5 (namely 3) below which there exist balls of a size insufficient to be correctly retained on the grills of the adsorbers.

From this, a selection of a mean granulometry ($\mu$) of adsorbent particles and of a breadth of granulometric distribution ($\sigma$) of said particles, such as the ratio ($\mu/\sigma$), will be comprised within the range 1.5 to 15, particularly in the optimum narrower range 3 to 10, and this selection permits providing a useful PSA process no matter what the type of granulometric distribution selected, in particular uniform or gaussian. In connection with this it must be emphasized that although these two distributions will be of different nature, they lead in a surprising manner to altogether comparable results, which permits the generalization that the present invention is useful for any type of granulometric distribution.

Thus, there is obtained a PSA process having an adsorption zone with substantially improved performance relative to those previously known. In other words, the inventors of the present invention have discovered, in a surprising manner, that the breadth of granulometric distribution ($\sigma$) of the particles of adsorbent plays a fundamental role in the efficiency of recovery of oxygen from ambient air.

What is claimed is:

1. In a PSA process for the separation of a gaseous feed containing at least one first component and one second component, by preferential adsorption of the first component on at least one bed of particles of at least one adsorbent material and recovering a gaseous flow enriched in said second component, with desorption of said first component; the improvement in which the ratio ($\mu/\sigma$) of the mean granulometry ($\mu$) of the particles of adsorbent contained in said at least one bed, to the breadth of granulometric distribution ($\sigma$) of said particles is comprised within the range of 1.5 to 15, said particles of adsorbent material being particles of zeolite exchanged with metallic cations, wherein the mean granulometry ($\mu$) and the breadth of the granulometric distribution ($\sigma$) are defined respectively by the following formulas:

$$\mu = \int_0^\infty x \cdot f(x) \cdot dx$$
$$\sigma^2 = \int_0^\infty (x-\mu)^2 \cdot f(x) \cdot dx.$$

2. A process according to claim 1, wherein the ratio ($\mu/\sigma$) is comprised between 2 and 13.

3. A process according to claim 1, wherein the ratio ($\mu/\sigma$) is comprised between 3 and 10.

4. A process according to claim 1, wherein the thickness of the bed of particles is comprised between 0.1 and 3 m.

5. A process according to claim 1, wherein the thickness of the bed of particles is comprised between 0.3 and 1.2 m.

6. A process according to claim 1, wherein the particles are particles of zeolite X or LSX.

7. A process according to claim 1, wherein the particles of zeolite contain metallic cations selected from the group consisting of calcium, lithium, zinc, strontium, magnesium, copper, aluminum, nickel, cobalt, manganese, chromium, barium, sodium, scandium, gallium, iron, indium, yttrium, lanthanides, and their mixtures.

8. A process according to claim 1, wherein the particles of adsorbent material are particles of zeolite LSX exchanged at least 60% with cations selected from the group consisting of lithium, calcium, and a mixture thereof.

9. A process according to claim 1, wherein said particles have a mean size comprised between 0.3 and 3 mm.

10. A process according to claim 1, wherein said particles have a mean size comprised between 0.5 and 2.2 mm.

11. A process according to claim 1, wherein said particles have a mean size comprised between 0.6 and 1.6 mm.

12. A process according to claim 1, wherein said particles have a mean size comprised between 0.8 and 1.2 mm.

13. A process according to claim 1, wherein the first component is nitrogen and the second component is oxygen and the gaseous feed is air.

* * * * *